United States Patent
Zoppas (10) Patent No.: US 6,824,731 B1
(45) Date of Patent: Nov. 30, 2004

(54) ENTERING INJECTION MOULDED PREFORMS IN A MOULD OF A HIGH-EFFICIENCY BLOW-MOULDING APPARATUS

(75) Inventor: Matteo Zoppas, Fontanafredda (IT)

(73) Assignee: Sipa S.p.A., Vittorio Veneto (IT)

( * ) Notice: Subject to any disclaimer, the term of this patent is extended or adjusted under 35 U.S.C. 154(b) by 284 days.

(21) Appl. No.: 10/031,596

(22) PCT Filed: Jun. 9, 2000

(86) PCT No.: PCT/EP00/05332

§ 371 (c)(1),
(2), (4) Date: Jan. 23, 2002

(87) PCT Pub. No.: WO01/07235

PCT Pub. Date: Feb. 1, 2001

(30) Foreign Application Priority Data

Jul. 23, 1999 (IT) ........................ PN99A0063

(51) Int. Cl.[7] ................ B29C 49/12; B29C 49/36; B29C 49/42; B29C 31/08
(52) U.S. Cl. ................ 264/523; 264/532; 425/529; 425/534; 425/535; 425/540
(58) Field of Search ................ 264/523, 532, 264/537; 425/529, 534, 535, 540

(56) References Cited

U.S. PATENT DOCUMENTS

| 3,415,915 A | * | 12/1968 | Lecluyse et al. | ........... 425/534 |
|---|---|---|---|---|
| 3,611,484 A | * | 10/1971 | Lecluyse et al. | ........... 425/540 |
| 3,977,822 A | * | 8/1976 | Reilly et al. | ........... 425/529 |
| 4,035,463 A | | 7/1977 | Rosenkranz et al. | ........ 264/531 |
| 4,313,720 A | * | 2/1982 | Spurr | ........... 425/534 |
| 4,317,793 A | * | 3/1982 | Hubert et al. | ........... 425/534 |
| 4,355,968 A | * | 10/1982 | Lagoutte et al. | ........... 425/526 |
| 5,618,489 A | * | 4/1997 | Weissmann | ........... 425/534 |

FOREIGN PATENT DOCUMENTS

| FR | 1430899 | 5/1966 |
|---|---|---|
| WO | WO9415770 | 7/1994 |
| WO | WO9962692 | 12/1999 |

* cited by examiner

Primary Examiner—Robert B. Davis
(74) Attorney, Agent, or Firm—Wenderoth, Lind & Ponack, L.L.P.

(57) ABSTRACT

Apparatus for blow moulding plastic containers, comprising a plurality of pairs of half-moulds (1, 2) capable of being coupled with each other, separated from each other and clamped together, said pairs (1, 2) being associated to an appropriate central structure and constituted by a stationary half-mould (1), which is substantially attached to said structure, and a respective moving half-mould (2) capable of being opened and clamped with a rotary motion, in which there are provided means adapted (3, 4) to arrange a respective preform (7) in a pre-defined position adapted for blow moulding, and to hold this preform (7) in this position regardless of the position of the respective half-moulds (1, 2), these means being in particular constituted by: a fork means (3) firmly joined to a respective stationary half-mould (1), a pincer-like gripper (5) adapted to transfer a respective preform (7) from an external position and fit it on to the respective fork means (3), and a small-tube (4) assembly adapted to be inserted in the mouth opening of the preform (7) when the latter is fitted on to the respective fork means (3).

30 Claims, 13 Drawing Sheets

ENTERING INJECTION MOULDED PREFORMS IN A MOULD OF A HIGH-EFFICIENCY BLOW-MOULDING APPARATUS

DESCRIPTION

BACKGROUND OF THE INVENTION

The present invention refers to an improved apparatus and a related process for blow molding preforms of thermoplastic material, in particular such an apparatus as generally described in the Italian patent application no. PN98A000042 filed by this same Applicant.

The peculiarities of the apparatus described in the above-cited patent application lie in the fact that it is provided with:
- a plurality of pairs of mutually joinable half-moulds, which are associated to an appropriate, preferably revolving structure for handling said half-moulds, and preform support devices corresponding to said half-moulds,
- a preform feeding mechanism to deliver an orderly sequence of preforms held at an appropriate blow-moulding temperature into the respective pairs of half-moulds kept in their opened position and associated to said rotary member.
- a pick-up device adapted to recover the finished container from the respective pair of half-moulds upon the opening thereof.
- an opening and clamping mechanism adapted to clamp the half-moulds together after they have moved through the position of the preform feeding mechanism, and to open them before they move through the position of the pick-up mechanism for removing the finished container, in which said pairs of half-moulds are constituted by a stationary half-mould and a moving half-mould capable of being opened from and clamped against said stationary half-mould.

In particular, said stationary half-moulds are substantially joined to said structure, which is preferably rotating about a vertical axis, and are arranged in a substantially vertical position, with the moving half-moulds adapted to be clamped against the respective stationary half-moulds with a substantially rotary movement having a horizontal axis of rotation.

The other general construction and use characteristics of the apparatus according to the present invention are thoroughly described in the afore cited Italian patent application no. PN98A000042, to which reference should therefore be made.

Anyway, to the purpose of favouring a better and readier understanding by a reader, the origin of and the technical-industrial ground on which said patent is based are briefly recalled here. In practice, it has been originated by the fact that, according to prior-art techniques, the blowing moulds in an in-line arrangement turn out to be particularly critical, since with increasing blow-moulding pressures, as well as with increasing numbers of cavities contained in each single pair of blow-moulding plates, increasingly rapid and powerful pumping stations are required. Furthermore, the increased overall pressure generated by the bottles during blow moulding must be contrasted by a correspondingly greater mould clamping pressure.

However, such a pressure, which is not only considerably higher, but also pulsating, has a negative effect also on the actual resistance of the same moulds, which are not only caused to undergo a greater pressure, but are at the same time required to withstand such a greater pressure on a longer arm, considering the greater number of blowing gates, and this of course makes their rigidity more critical and their tendency to deform outwardly much more likely, with easily imaginable effects on the quality of the blow-moulding process and the blow-moulded bottles themselves.

Furthermore, when blowing moulds provided with a great number of cavities are used, the time required to transfer all preforms into the respective cavities increases proportionally, and his of course causes the whole cycle time to INCREASE under a clear reduction in the productivity of the moulding apparatus.

Just in view of doing away with these drawbacks, the practice is known from the disclosures in the publications U.S. Pat. No. 3,596,315-U.S. Pat. No. 4,233,022-EP 0 596 487- U.S. Pat. No. 4,850,850 and U.S. Pat. No. 4,313,720 of using to preform blow moulding purposes apparatuses that are adapted to rotate about a vertical axis in a carousel-like manner, in which the outer sides are occupied by a plurality of blowing half-moulds capable of opening from and camping against each other in an orderly and sequential manner. However, in these apparatuses it is actually both half-moulds that are driven to move. They furthermore move in a so-called "book-like" manner, in that each one of them moves about a respective vertical axis.

Apparatuses of this kind are connected with generally known drawbacks and construction complications, since both half-moulds must be handled to move synchronically. Furthermore, the fact that they open in a horizontal direction, and therefore by widening apart, makes it necessary for the entire carousel-like arrangement to be sized correspondingly; it in particular requires apparatuses to be used which are significantly larger and, therefore, more awkward to be handled and installed.

In view of doing away with the problems connected with the use of moving half-moulds rotating about respective vertical axes, an apparatus of the kind described in the afore mentioned Italian patent application has been disclosed.

Nevertheless, even this kind of apparatus has still some problem left with it and offers margins for further improvement, which may be summarized as follows:
- the need for the neck of the preform to be locked in place, ie. clamped with a mould (the half-moulds) makes it necessary for the same preform to be released from its transferring means only upon the half-moulds being completely clamped together, this of course requires that the related operations be carried out in series, ie. in a sequence, under resulting greater usage of time, which of course contributes to an increased overall cycle time and, therefore, a marked reduction in the performance capabilities and the general productivity of the entire apparatus;
- furthermore, upon the final container having been blow-moulded, the opening of the mould quite frequently gives rise to a slight displacement of the respective container and this makes much more difficult for an appropriately provided pick-up and unloading member to engage the neck portion of the container and then transfer the same container into the next station.

OBJECT OF THE INVENTION

From U.S. Pat. No. 4,035,463 it is known a method and an apparatus for blowing preforms in a rotary table (EIII) with blow molds. Each of said blow molds consists of two symmetrical halves (62), supported by a commmon vertical spindle, so that said halves are misplaced in the horizontal plane. Furthermore, the preforms are previously heated and positioned in a concurring rotary table (EII) and the transfer from said heating table (EII) and the blowing rotary table (EIII) is carried out by a rotary station (D) where rotation axis is vertical, as the vertical spindle (55). However, if a blowing machine is used, having blowing halves, one of which is fixed and oriented outwards, the other being rotatable on an horizontal spindle (instead of a vertical spindle), the technical arrangement and solution described in the cited U.S. patent can not be used due to the interference between said station (D) rotating horizontally and the halves blow mold rotating vertically.

Based on the above considerations, it is therefore a main purpose of the present invention to provide the blow moulding apparatus for the production of hollow bodies, as well as the operating mode thereof, in such a manner as to enable its productivity to be increased by the effect of an accelerated movement of the blowing half-moulds.

A further purpose of the present invention is to make it possible for the blow-moulded container to be firmly and reliably held in position when the respective half-moulds are opened.

The apparatus and the method according to the present invention shall furthermore be capable of being implemented with the use of currently available techniques and, therefore, shall be reasonably low-cost, reliable and preferably capable of being integrated with a preform production stage situated upstream.

BRIEF DESCRIPTION OF THE DRAWINGS

These aims, along with other features of the present invention, are reached in a blow moulding apparatus that is made and operates as recited in the appended claims, and may be implemented in some parts, or arrangements thereof, a preferred embodiments of which is described below in detail and illustrated with reference to the accompanying drawings, in which:

DETAILED DESCRIPTION OF THE PREFERRED EMBODIMENT

The basic peculiarity of the present invention lies in the use, in an apparatus of the described type, of devices and methods that are capable of locating and clamping a preform in a suitable position in view of the subsequent blow moulding step, regardless of the actual position of the respective pair of blow-moulding half-moulds.

This result is obtained, in a pair of blow-moulding half-moulds 1 and 2, by means of following devices:

a fork means 3 which is firmly joined to a first one 1 of said blow-moulding half-moulds 1 and 2, a small-tube assembly 4 adapted to be at least partially inserted in the mouth opening 6 of the preform 7 when the latter is associated to said fork means 3, a pincer-like gripper 5 adapted to transport said preform so as to enable it to engage the respective fork means 3.

Figure 1:
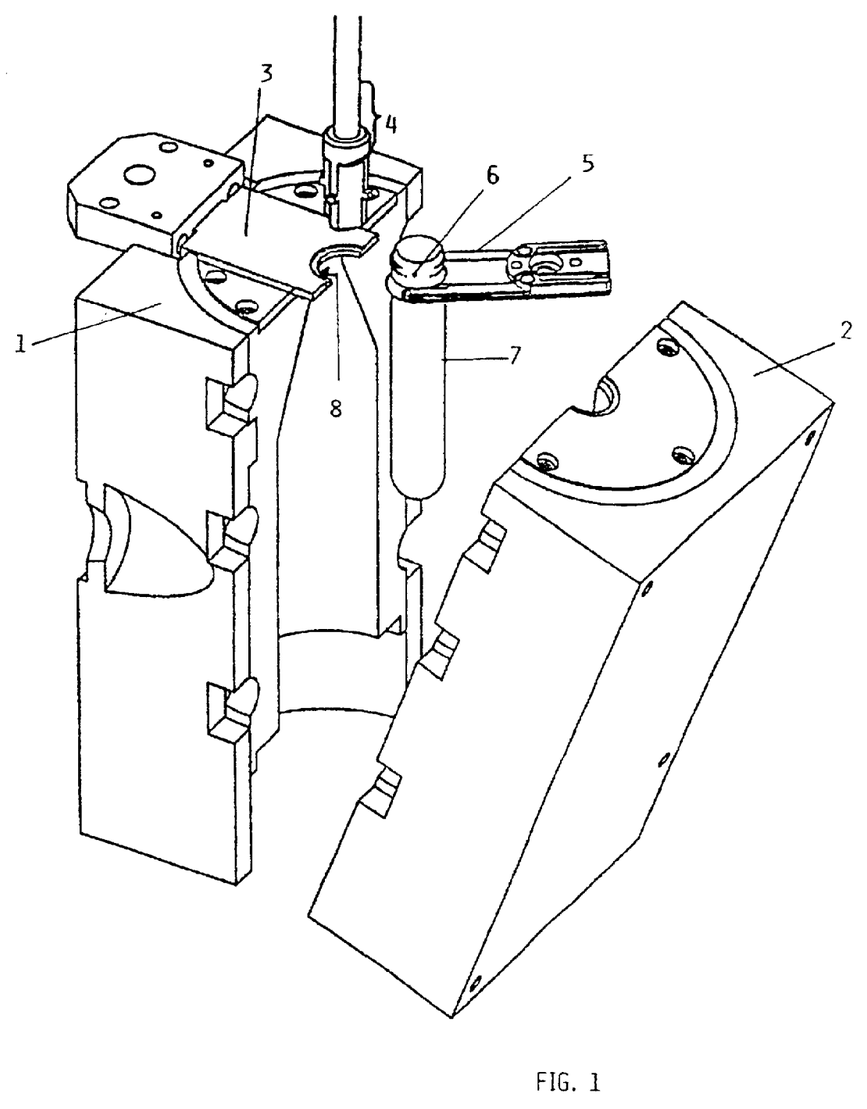
FIGS. 1 through 5 are perspective views of a portion of apparatus according to the invention, illustrated to represent five subsequent operating phases.
Figure 1A:
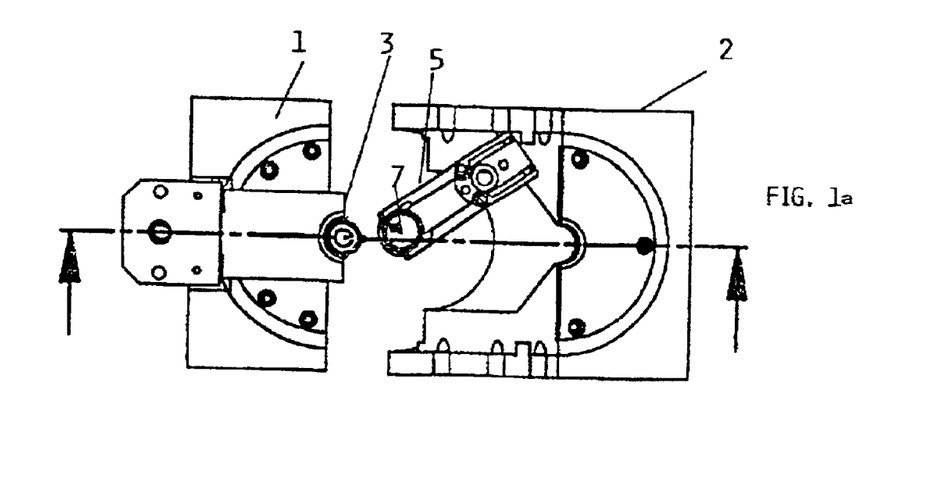
FIGS. 1a, 1b are a top view of a portion of the apparatus of FIG. 1 and the median cross-section thereof taken along section A—A of FIG. 1a, respectively.
Figure 1B:
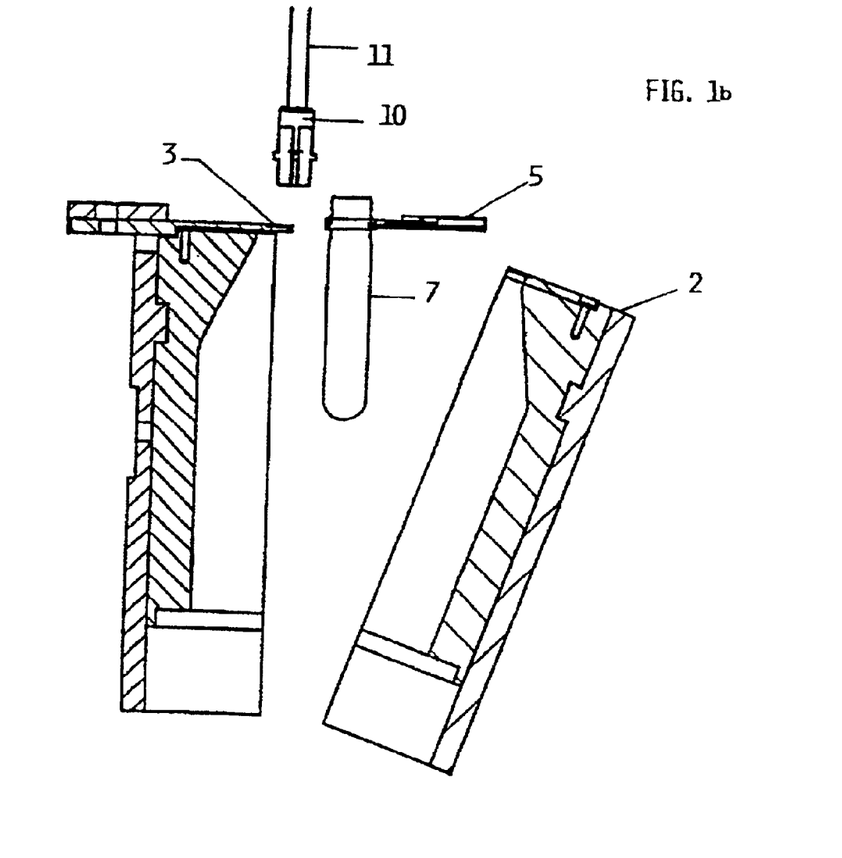

If FIGS. 1 through to 5 are in particular observed, along with the respective top and cross-sectional views, at least the following five phases can be identified, in which said component parts are caused to operate in a coordinated manner so as to achieve the desired result.

Figure 2:
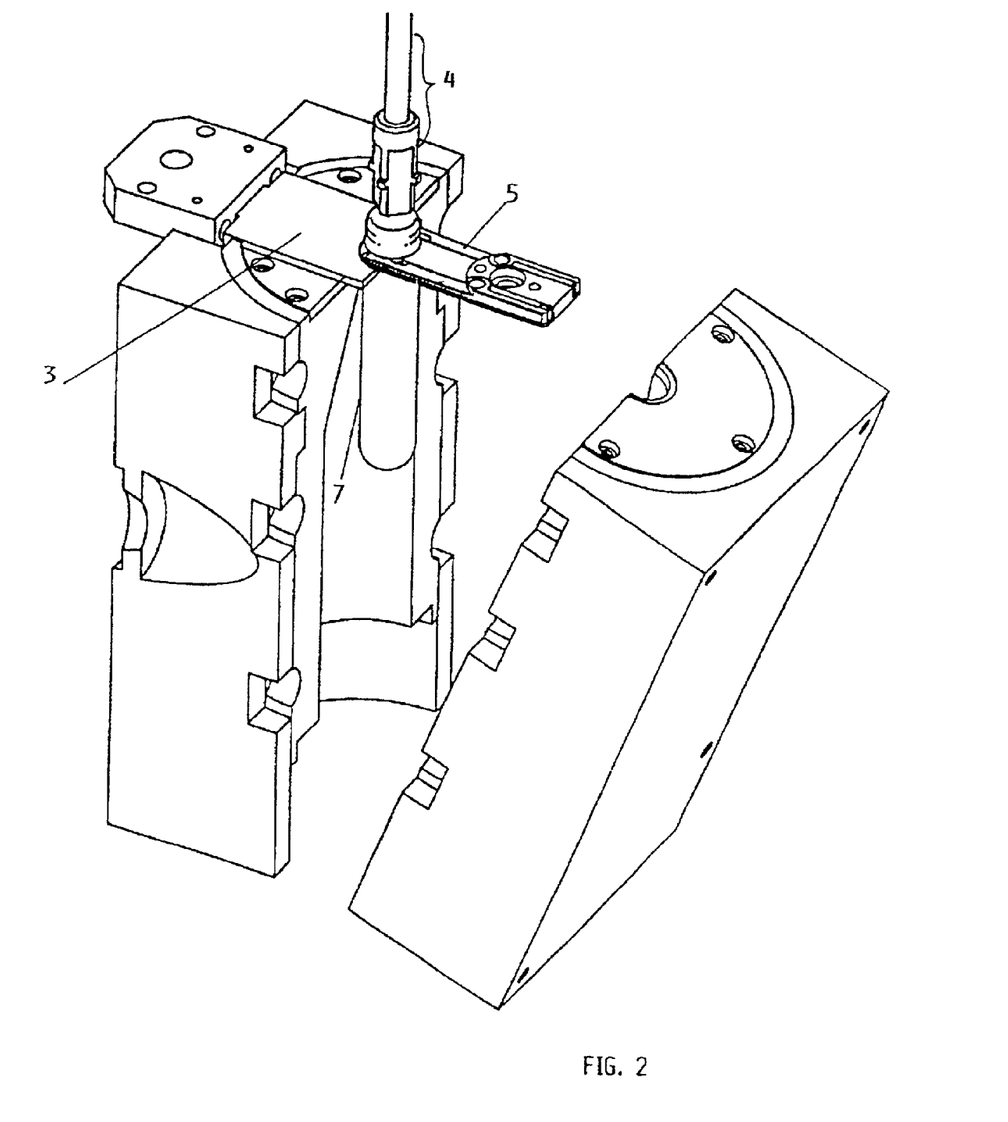
Figure 2A:
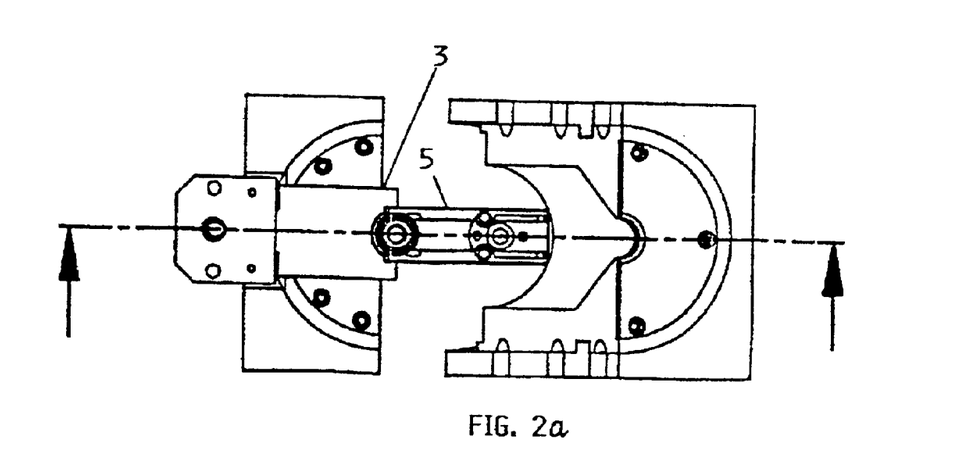
FIGS. 2a and 2b are views similar to those of FIG. 1a, 1b above, but refer to FIG. 2; the same applies also to FIGS. 3a and 3b, 4a and 4b, and 5a and 5b with reference to the perspective views in FIGS. 3, 4 and 5.
Figure 2B:
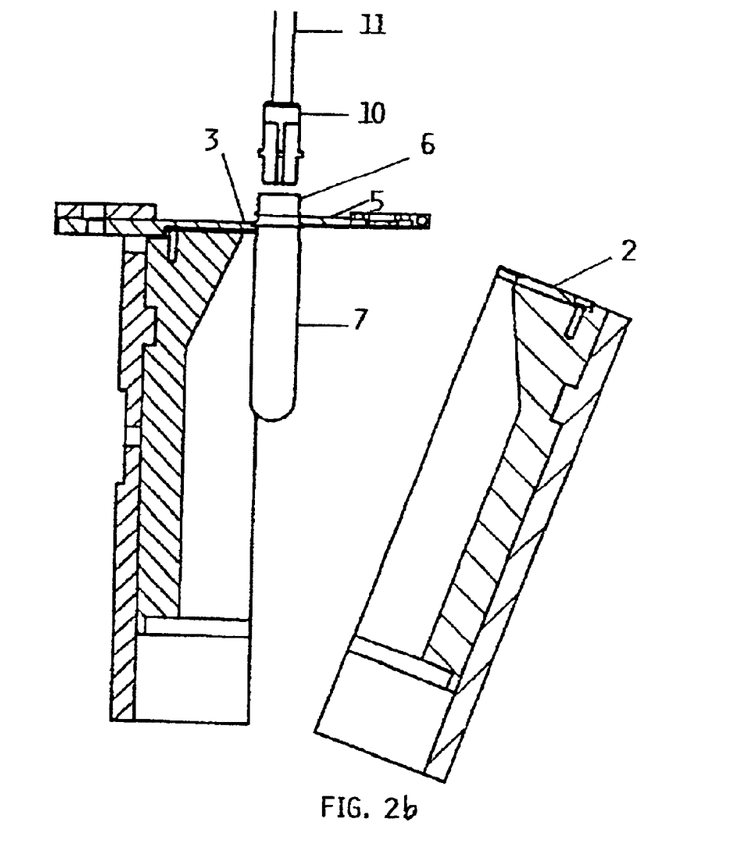

Said five phases, each one of which is represented by the illustrations in the subsequent FIGS. 1, 2, 3, 4 and 5 for reasons of greater simplicity, may be described as follows:

Phase a) FIG. 1. The half-moulds 1 and 2 are at least partially open; the gripper 5, to which the preform 7 is coupled, is gradually approached to the fork means 3, and namely to a receptacle 8 provided facing the second half-mould 2; in this phase, the small-tube assembly 4 is in a position in which it is raised from its working position, which will be explained in greater detail further on:

Phase b) FIG. 2. The gripper 5 transports the preform 7 up to into said receptacle 8 of the fork means 3. In particular, it is the cylindrical portion underneath the neck ring 14 of the preform that fits into said receptacle 8, so that the preform itself is positively prevented from sliding downwards and also from displacing laterally with respect to the half-mould 1.

All other illustrated component parts remain in their initial position, with the exception of the second half-mould 2 which can start, or continue, its clamping stroke.

Figure 3:
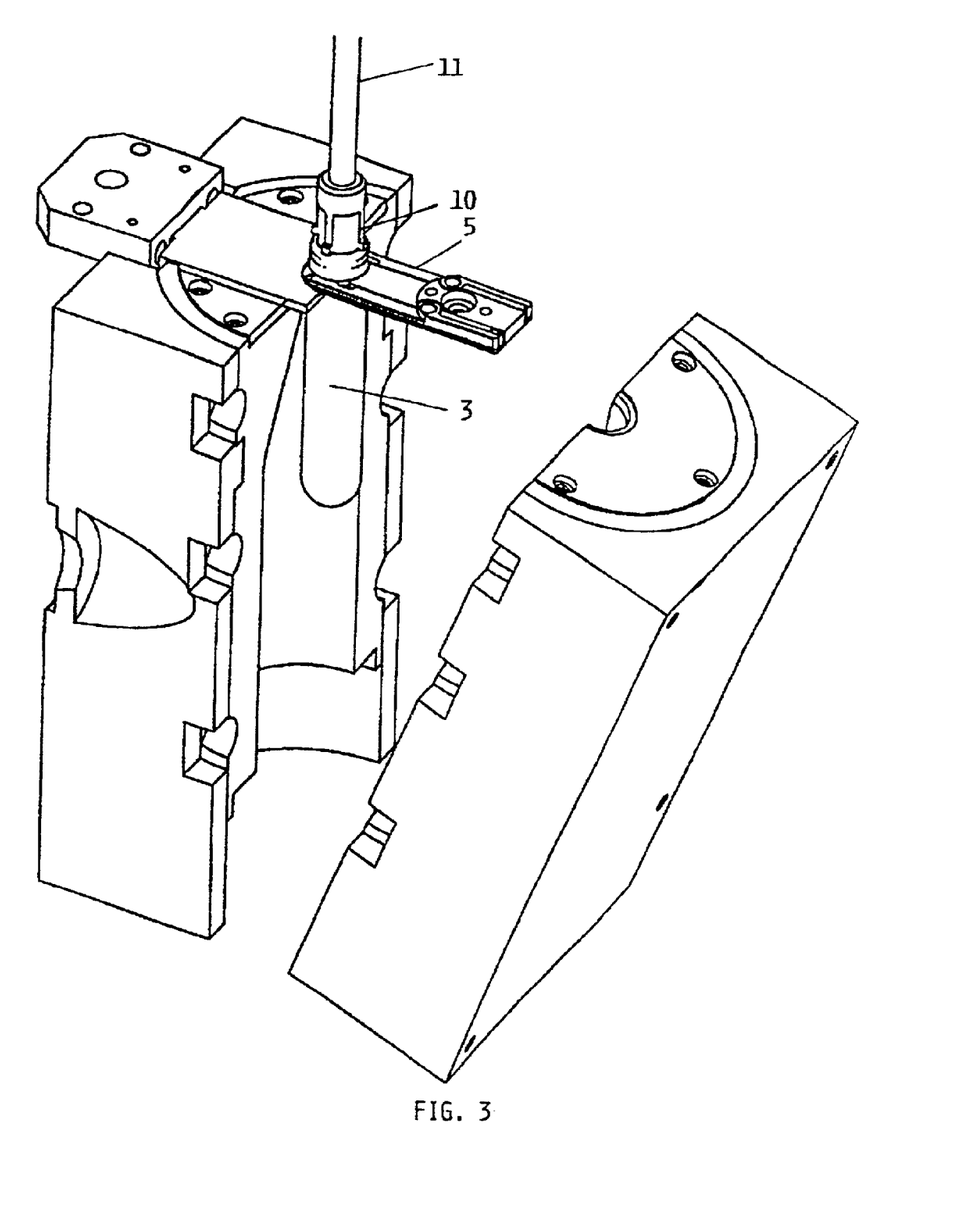
Figure 3A:
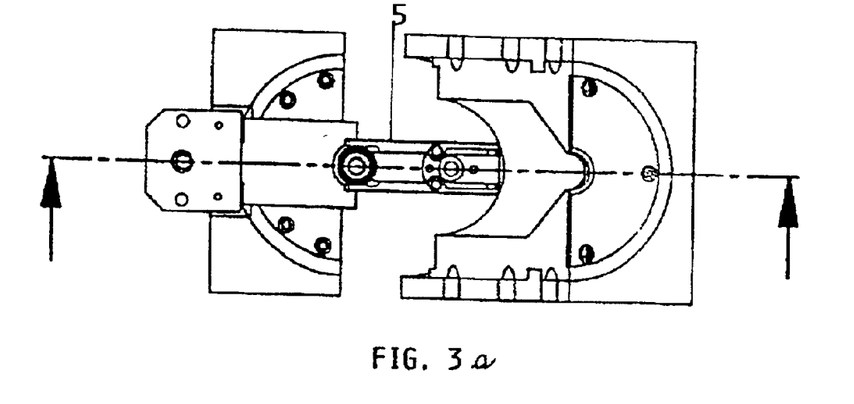
Figure 3B:
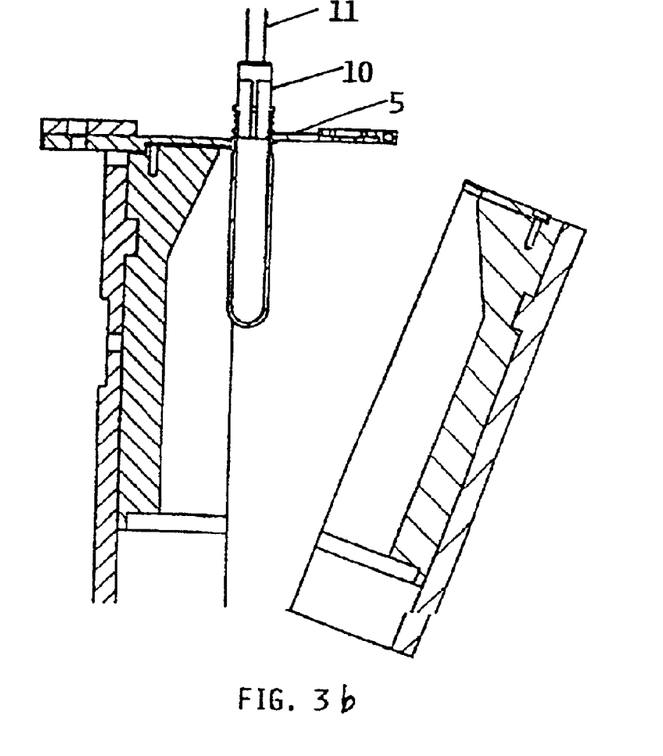

Phase c). FIG. 3. The small-tube assembly 4 is lowered until it is inserted in the mouth opening 6 of the preform.

This small-tube assembly is formed by an insert 10, in the interior of which there is slidably arranged a traditional stretching rod 11; this insert has a substantially cylindrical shape and is provided with a plurality of external ribs 13 which are in such a size and geometry as to be able to get exactly inserted into the inner cylindrical wall of the mouth portion of the preform, so that, when said insert is lowered with the small-tube assembly 4, it becomes disposed on to the preform in a firmly joined manner therewith.

Figure 8:
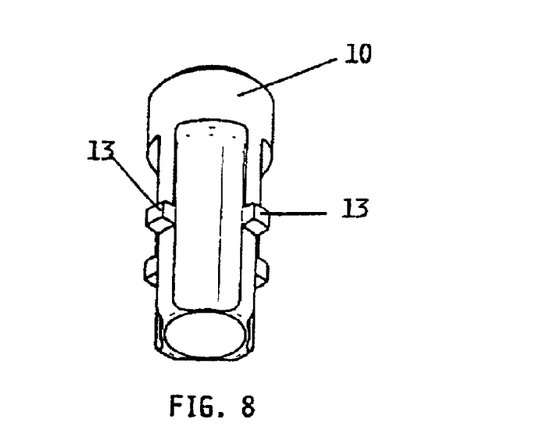
FIG. 8 is a perspective view of a component part of an apparatus according to the present invention.
Figure 9:
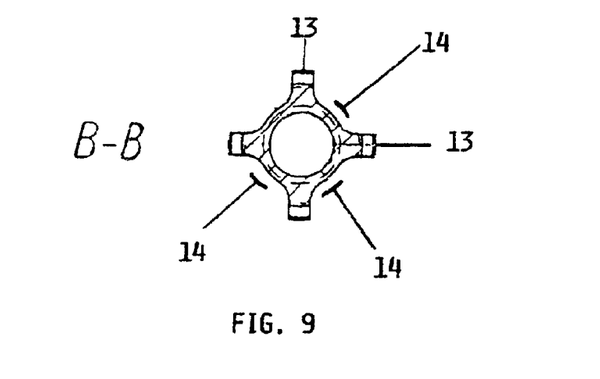
FIGS. 9 and 10 are a bottom and a front view, respectively, of the component part of FIG. 8.
Figure 10:
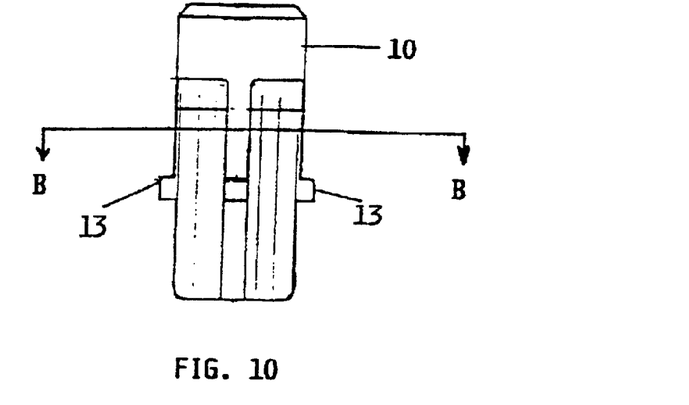

Furthermore, between said outer ribs 13 there are provided corresponding passages 14 adapted to enable gas to flow from the outside of the preform into the interior of the latter (see FIGS. 8, 9 and 10); the purpose of these passages is to enable the gas needed to blow mould the preforms to flow in when the small-tube assembly 4 is lowered and, therefore, when the respective insert is firmly fitted into the mouth portion of the respective preform.

Figure 4:
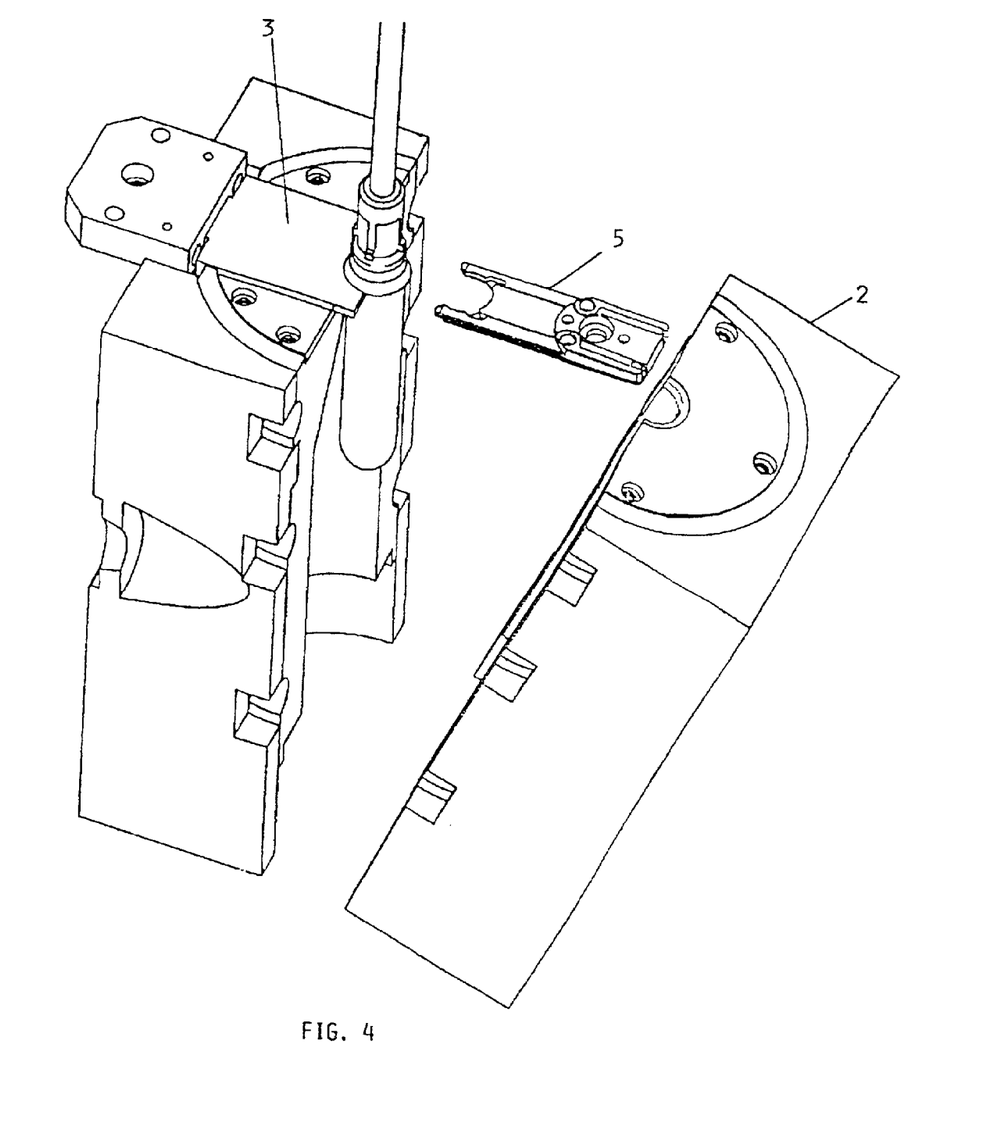
Figure 4A:
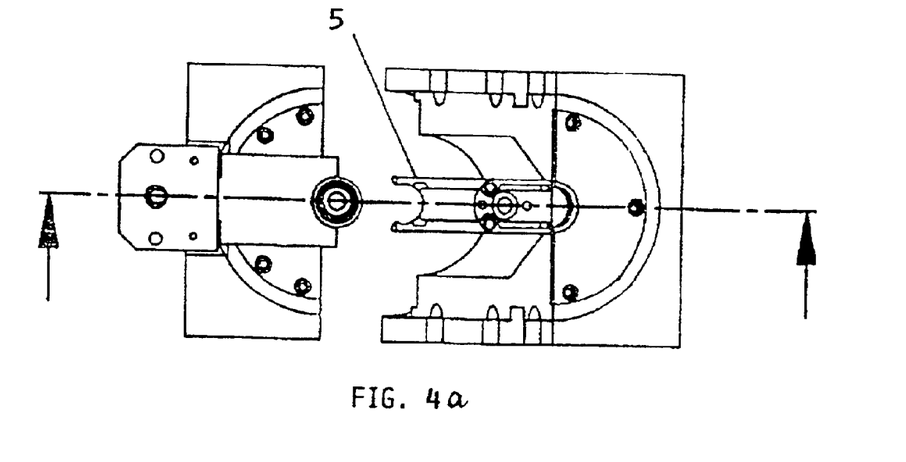
Figure 4B:
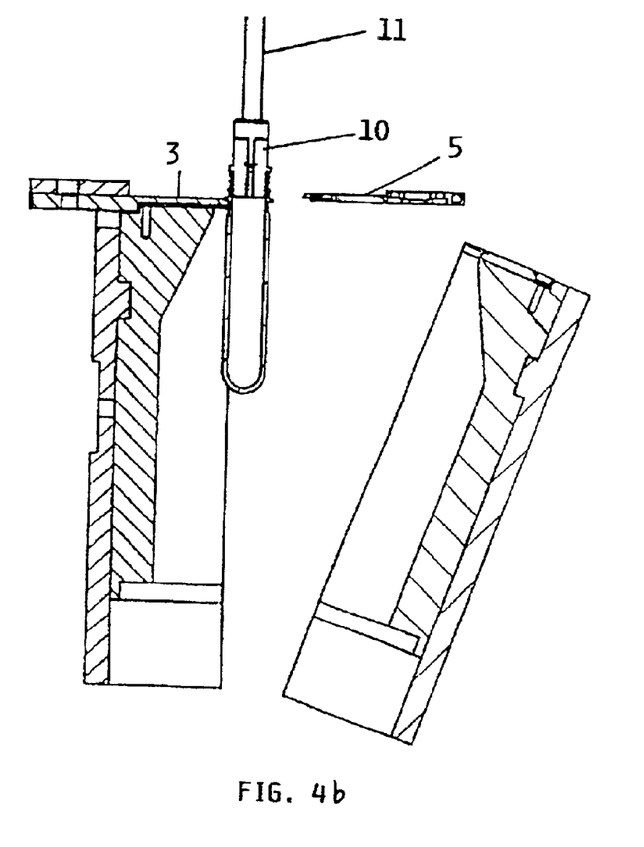

Phase d) FIG. 4. The gripper 5 is separated from the respective preform and is moved into an appropriate position in view of a subsequent preform loading phase.

The possibility for the gripper 5 to be separated by simply pulling it away is ensured in a particularly easy and safe manner, without any risk of damaging the preform, if a gripper is used of the type described in the Italian utility model application no, PN99U000023 filed by this same Applicant.

It should be noticed that it is in this phase d) that the condition is practically created which brings about most of the advantage offered by the present invention: in fact, the stability of the position of the preform is determined by the combined action of the insert 10, which prevents the preform from moving or displacing tangentially, and the fork means 3 which, by engaging the preform underneath the neck ring 14 thereof, prevents it from sliding downwards.

In this condition, the preform itself is completely associated in a firm manner to a half-mould in a position in which it is adapted to be blow moulded, regardless of the position of the other counter-mould, which can in this way continue with its clamping stroke.

Figure 5:
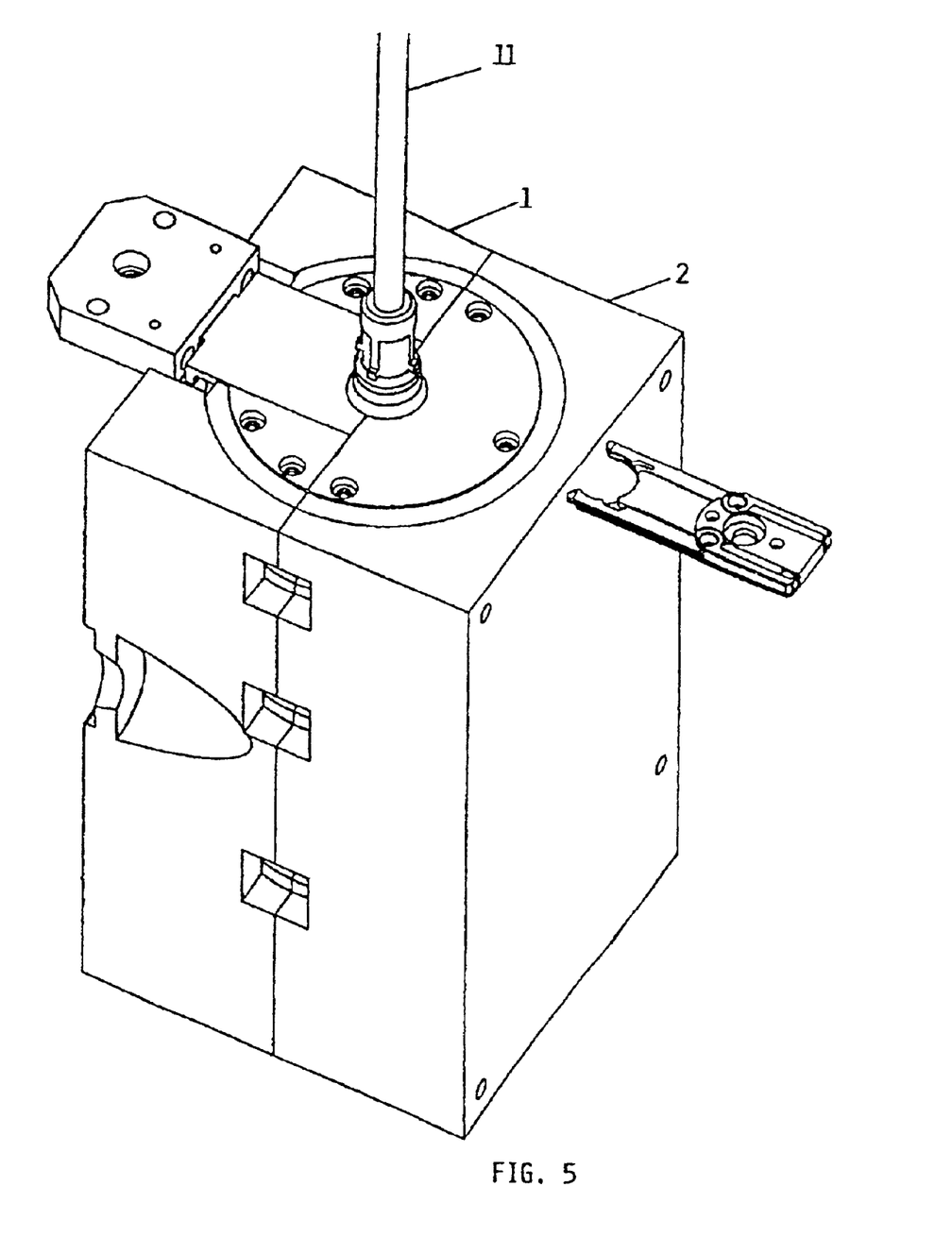
Figure 5A:
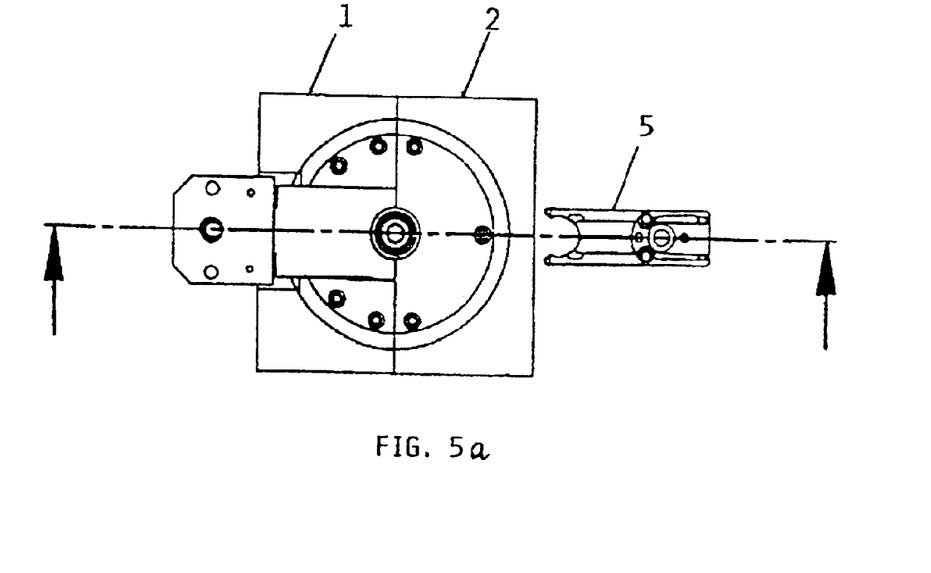
Figure 5B:
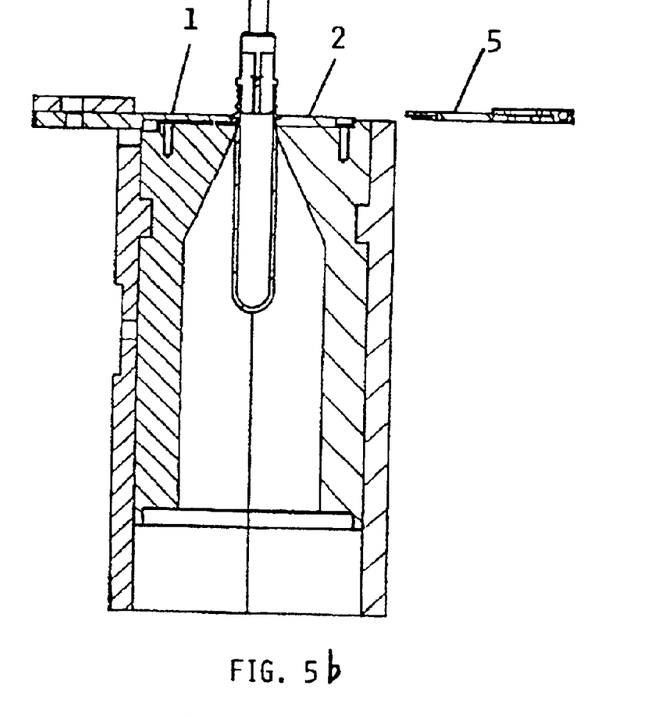
Figure 6:
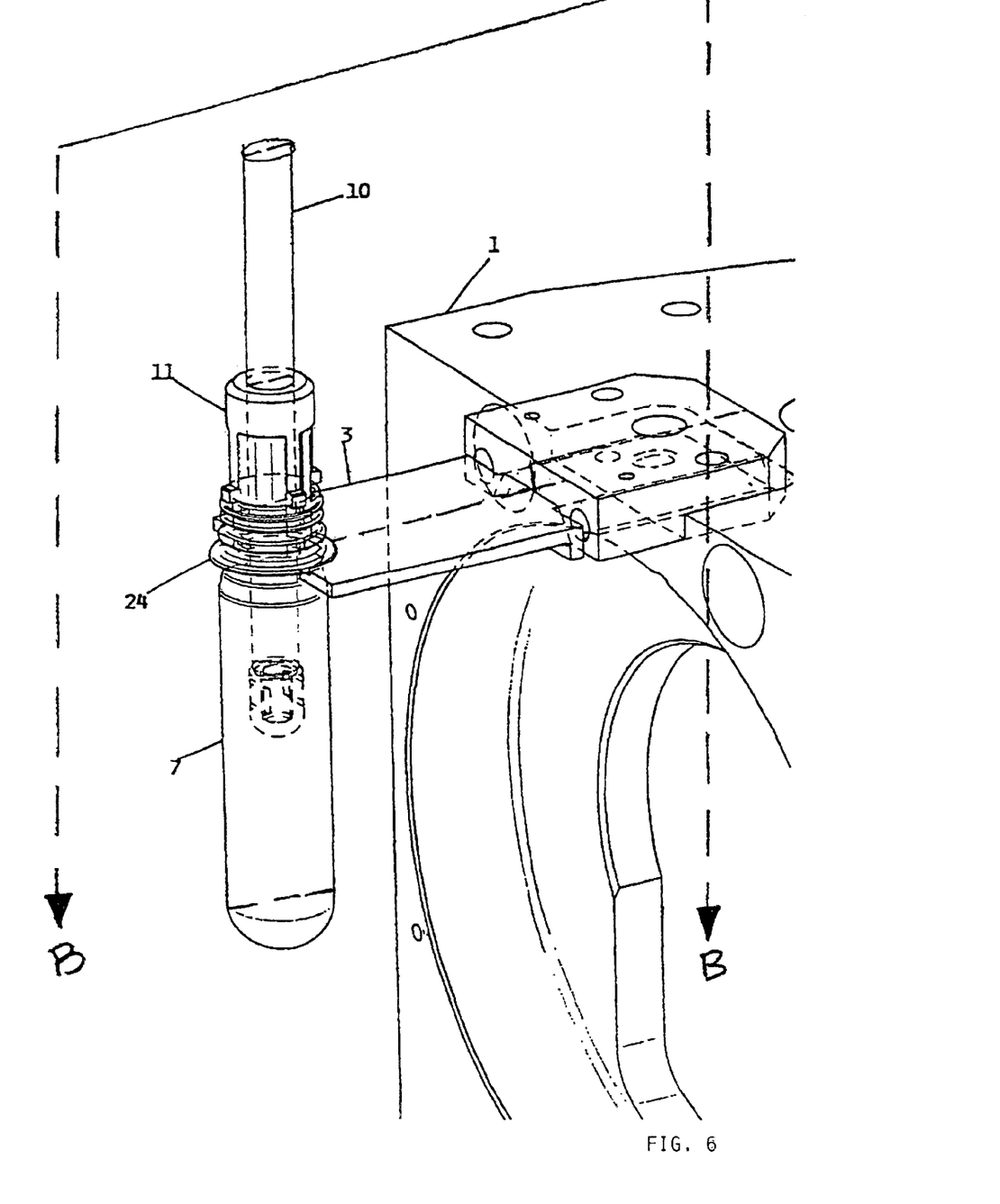
FIG. 6 is a different perspective, and partly transparent view of the same assembly as FIG. 4.
Figure 7:
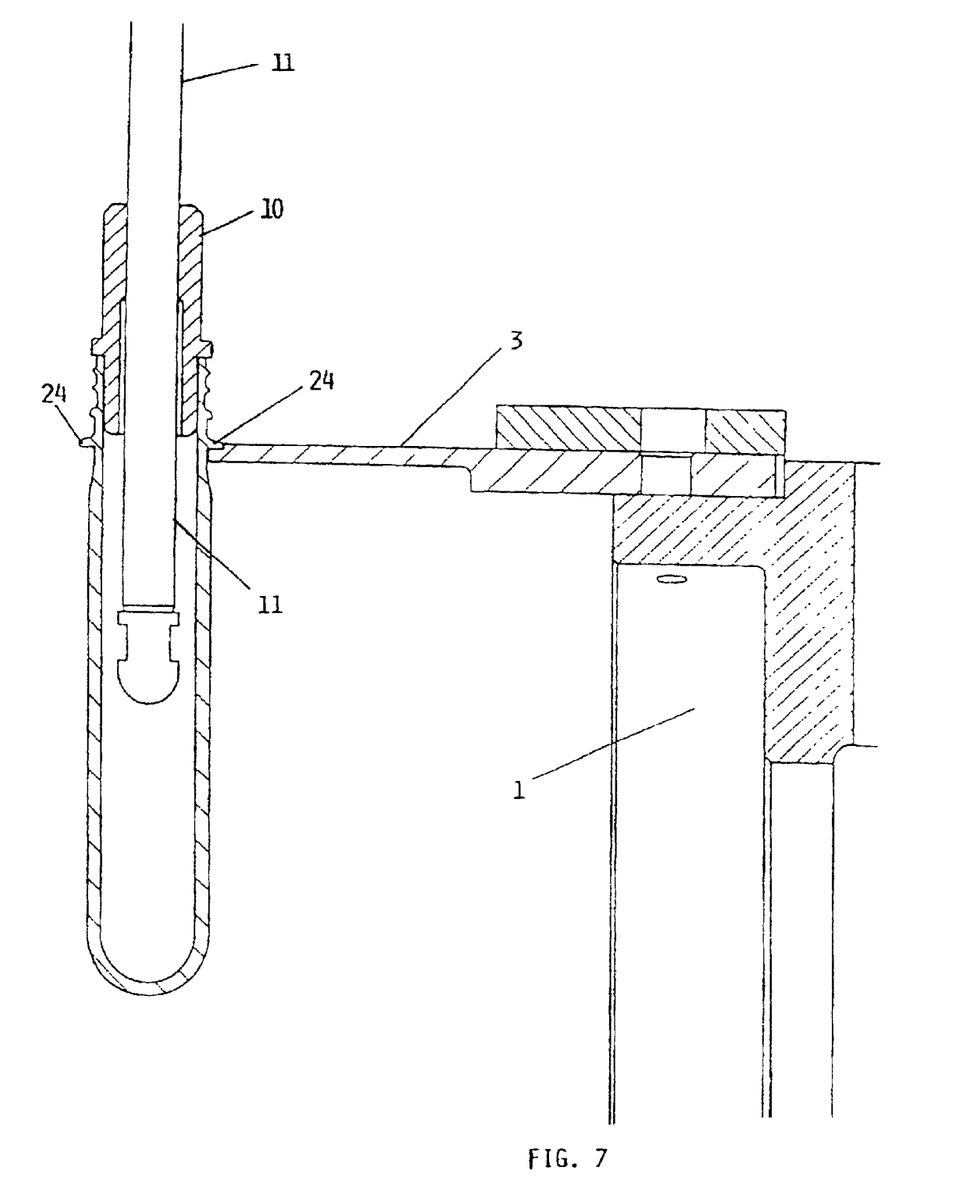
FIG. 7 is a simplified view along section B—B of FIG. 6.

Phase e) FIG. 5. The two half-moulds are completely clamped against each other, in particular, the moving half-mould 2 brings its previously started stroke to completion, so as to close in on the half-mould 1.

It can therefore be readily recognized that a saving can be obtained on the overall cycle time if the fact is duly considered that final positioning of the preform in view of blow moulding takes actually place well in advance of the half-moulds being closed and clamped together, so that the preform handling gripper is able to start releasing the preform and moving away beforehand and the time required for the moulds to be clamped in order to have the preform duly locked in position can actually be saved (since the preform itself is already locked in position by the above cited means).

From this phase on, the process goes on according to the traditional technique until the actual blow-moulding phase is eventually completed, at the end of which the half-moulds are then separated and the blow-moulded container is removed by a respective gripper in a sequence of operations that is fully similar to, albeit in the reverse order, the sequence followed for loading the preform in the mould.

The reader should furthermore duly notice that the use of the small-tube assembly 4, comprising its insert piece and stretching rod, is not to be considered as being inherently part of the present invention, since similar devices are already known and used in the technical practice. An integral part of this invention is on the contrary the particular type of totally new and original use that is made of such a small-tube assembly.

In fact, this small-tube assembly is used not only to perform traditionally as a stretching rod and channel for the blow-moulding gas to flow therethrough, but also as an innovative means for centering the preform and locking it in position by acting in combination with the afore mentioned fork means, in such a manner as to lock the preform in the desired position without using the half-moulds and regardless of the position of the same half-moulds.

In practice it can be concluded that, with the method according to the present invention, ie. owing to the clamping phase of the moving half-mould occurring almost at the same time as the preform insertion phase, as well as the opening phase of the same moving half-mould occurring almost at the same time as the moulded-container removal or ejection phase, thanks to the particular conformation, arrangement and use of the afore described devices, a reduction in total blow-moulding cycle time can actually be obtained.

The described apparatus and method can be most effectively used if a plurality of pairs of half-moulds are applied all along the outer periphery of a generally per se known central rotary structure 20, in which:

in each one of said pairs, one of said half-moulds 1 is stationary and joined to said rotary structure and is preferably arranged on a vertical plane with the respective half-cavity 1A facing outwards and oriented radially with respect to said rotary structure;

the other half-mould 2 is movable with a rotary motion about an axis arranged on the horizontal plane as hinged on a rotation device (not shown) in such a manner that, when it is raised into its clamped position, it is able to move into exact coupling with said stationary half-mould joined to said rotary structure. In this way the need will only arise for the sole opening and closing movement of the moving half-mould 2 to be actuated, since the other half-mould 1 is stationary and substantially joined to the rotary structure 20.

Therefore, if the various phases into which the cycle time can be broken down. ie. (to name just the more important ones):

preform insertion (at a fixed station),
lowering of the small-tube assembly,
mould clamping,
blow moulding.
mould opening,
raising of the small-tube assembly,
removal and unloading of the finished container at a fixed station, are so adjusted and arranged as to be able to be carried out during exactly a complete rotation of the rotary structure, a particularly efficient and simple apparatus will be obtained which is capable of ensuring a really considerable productivity-to-size (ie. space requirements) ratio as compared with rotary apparatuses of a traditional type.

What is claimed is:

1. Apparatus for blow moulding hollow plastic containers, comprising:

a plurality of pairs of openable and closable half-moulds capable of being coupled to each other and clamped together, said pairs being associated to an appropriate central structure, devices to handle, transfer and introduce the preforms in said corresponding half-moulds as these are kept in their open position, a pick-up device adapted to remove the blow-moulded container from the pair of half-moulds upon them being opened, ie. separated, a mould opening and closing mechanism adapted to close, ie. clamp said half-moulds together upon them having passed through the position in which preform insertion is carried out, and to open said half-moulds from each other in correspondence of the mechanism provided to remove the finished container therefrom, means adapted to arrange a respective preform in a pre-defined position suitable for blow moulding, and to hold it in this position regardless of the position and mutual relation of said respective pair of half-moulds, in particular when said half-moulds are at least partially open, ie. separated from each other, characterized in that said means comprise:

a fork member joined to a respective stationary half-mould and provided with a receptacle adapted to place the respective preform into said respective pre-defined position, a pincer-like gripper adapted to transfer a respective preform from an external position and automatically fit it into said receptacle of the respective fork member, as well as to automatically disengage from said preform upon the latter having been firmly fitted into said respective receptacle, a small-tube assembly adapted to move into inserting in the mouth portion of said preform when the latter is so restrained in said respective receptacle.

2. Apparatus according to claim 1, characterized in that the locked condition of said preform is determined:
- either by it engaging said pincer-like gripper (5),
- either by it engaging said pincer-like gripper (5),
- or by the combined action of said fork member (3) and the respective small-tube assembly (4).

3. Apparatus according to claim 2, characterized in that said small-tube assembly comprises:
- a substantially cylindrical insert piece (10) adapted to firmly fit into the mouth portion of the respective preform,
- a stretching rod (11), which is provided slidably inside of said insert piece and is adapted to be displaced in a rectilinear manner into the respective preform when said respective insert piece is so firmly fitted into the mouth portion of said respective preform.

4. Apparatus according to claim 3, characterized in that said insert piece (10) is provided along its periphery with a plurality of passages or recesses (14) adapted to enable gas to flow from the outside to the inside of the respective preform when said insert piece is fully and firmly fitted and locked into the respective preform.

5. Apparatus according to claim 1, characterized in that said central structure (20), to which said pairs of half-moulds are associated, is a rotary structure on a horizontal plane, and said pairs of half-moulds are arranged, preferably regularly spaced from each other, along a circular periphery centered on the axis of rotation of said rotary structure.

6. Apparatus according to claim 5, characterized in that said pairs of half-moulds are comprised of a respective stationary half-mould (1) and a respective moving half-mould (2) capable of opening from and closing against the respective stationary half-mould.

7. Apparatus according to claim 6, characterized in that said stationary half-moulds are substantially joined to said appropriate central structure (20) and are arranged in a substantially vertical position, and the respective moving half-moulds (2) are adapted to move into clamping with a substantially rotary movement about respective horizontal axes of rotation.

8. Apparatus according to claim 7, characterized in that said horizontal axes are orthogonal to the axis of rotation of said rotary central structure.

9. Method for inserting and locking a preform in a pre-determined position of a pair of blow-moulding half-moulds, characterized in that it comprises following five phases, in which:
- a) said preform is approached to said pre-determined position by means of a respective gripper (5) adapted to engage said preform, said gripper being capable to be transferred in a controllable manner into an appropriate disposition with respect to a pre-defined one (1) of said half-moulds:
- b) said preform is locked in place with respect to an appropriate receptacle member (8) that is firmly joined to said pre-defined one (1) of said half-moulds;
- c) an appropriate small-tube assembly, which is comprised of an insert piece (10) and a respective stretching rod (11), is inserted in the mouth portion (6) of said preform;
- d) said gripper (5) automatically disengages from the respective preform;
- e) said pair of half-moulds moves into closing and clamping.

10. Method according to claim 9, characterized in that the above cited phases d) and e) are adapted to be performed at least partially at the same time.

11. Method according to claim 9, characterized in that the above cited phases c) and e) are adapted to be performed at least partially at the same time.

12. Method according to claim 9, characterized in that said rotary central structure is adapted to support a plurality of pairs of said half-moulds, and that said five phases a) to e) are performed in an automatic, continuous and orderly sequence for said plurality of pairs of said half-moulds.

13. Method according to claim 12, characterized in that the rotation period of said rotary central structure coincides with the cycle time corresponding to the steps during which
- the preform is loaded in the mould,
- the mould is closed and clamped,
- the preform is blow moulded through the various steps connected with the process,
- the mould is opened by the separation of the respective half-moulds,
- the blow-moulded product is removed therefrom.

14. Apparatus according to claim 2, characterized in that said central structure (20), to which said pairs of half-moulds are associated, is a rotary structure on a horizontal plane, and said pairs of half-moulds are arranged, preferably regularly spaced from each other, along a circular periphery centered on the axis of rotation of said rotary structure.

15. Apparatus according to claim 3, characterized in that said central structure (20), to which said pairs of half-moulds are associated, is a rotary structure on a horizontal plane, and said pairs of half-moulds are arranged, preferably regularly spaced from each other, along a circular periphery centered on the axis of rotation of said rotary structure.

16. Apparatus according to claim 4, characterized in that said central structure (20), to which said pairs of half-moulds are associated, is a rotary structure on a horizontal plane, and said pairs of half-moulds are arranged, preferably regularly spaced from each other, along a circular periphery centered on the axis of rotation of said rotary structure.

17. Apparatus according to claim 14, characterized in that said pairs of half-moulds are comprised of a respective stationary half-mould (1) and a respective moving half-mould (2) capable of opening from and closing against the respective stationary half-mould.

18. Apparatus according to claim 15, characterized in that said pairs of half-moulds are comprised of a respective stationary half-mould (1) and a respective moving half-mould (2) capable of opening from and closing against the respective stationary half-mould.

19. Apparatus according to claim 16, characterized in that said pairs of half-moulds are comprised of a respective stationary half-mould (1) and a respective moving half-mould (2) capable of opening from and closing against the respective stationary half-mould.

20. Apparatus according to claim 17, characterized in that said stationary half-moulds are substantially joined to said appropriate central structure (20) and are arranged in a substantially vertical position, and the respective moving half-moulds (2) are adapted to move into clamping with a substantially rotary movement about respective horizontal axes of rotation.

21. Apparatus according to claim 18, characterized in that said stationary half-moulds are substantially joined to said appropriate central structure (20) and are arranged in a substantially vertical position, and the respective moving half-moulds (2) are adapted to move into clamping with a substantially rotary movement about respective horizontal axes of rotation.

22. Apparatus according to claim 19, characterized in that said stationary half-moulds are substantially joined to said appropriate central structure (20) and are arranged in a substantially vertical position, and the respective moving half-moulds (2) are adapted to move into clamping with a substantially rotary movement about respective horizontal axes of rotation.

23. Apparatus according to claim 20, characterized in that said horizontal axes are orthogonal to the axis of rotation of said rotary central structure.

24. Apparatus according to claim 21, characterized in that said horizontal axes are orthogonal to the axis of rotation of said rotary central structure.

25. Apparatus according to claim 22, characterized in that said horizontal axes are orthogonal to the axis of rotation of said rotary central structure.

26. Method according to claim 10, characterized in that the above cited phases c) and e) are adapted to be performed at least partially at the same time.

27. Method according to claim 10, characterized in that said rotary central structure is adapted to support a plurality of pairs of said half-moulds, and that said five phases a) to e) are performed in an automatic, continuous and orderly sequence for said plurality of pairs of said half-moulds.

28. Method according to claim 11, characterized in that said rotary central structure is adapted to support a plurality of pairs of said half-moulds, and that said five phases a) to e) are performed in an automatic, continuous and orderly sequence for said plurality of pairs of said half-moulds.

29. Method according to claim 27, characterized in that the rotation period of said rotary central structure coincides with the cycle time corresponding to the steps during which the preform is loaded in the mould, the mould is closed and clamped, the preform is blow moulded through the various steps connected with the process, the mould is opened by the separation of the respective half-moulds, the blow-moulded product is removed therefrom.

30. Method according to claim 28, characterized in that the rotation period of said rotary central structure coincides with the cycle time corresponding to the steps during which the preform is loaded in the mould, the mould is closed and clamped, the preform is blow moulded through the various steps connected with the process, the mould is opened by the separation of the respective half-moulds, the blow-moulded product is removed therefrom.

\* \* \* \* \*